(No Model.)
N. O. BOND.
WASH STAND.
No. 285,001. Patented Sept. 18, 1883.
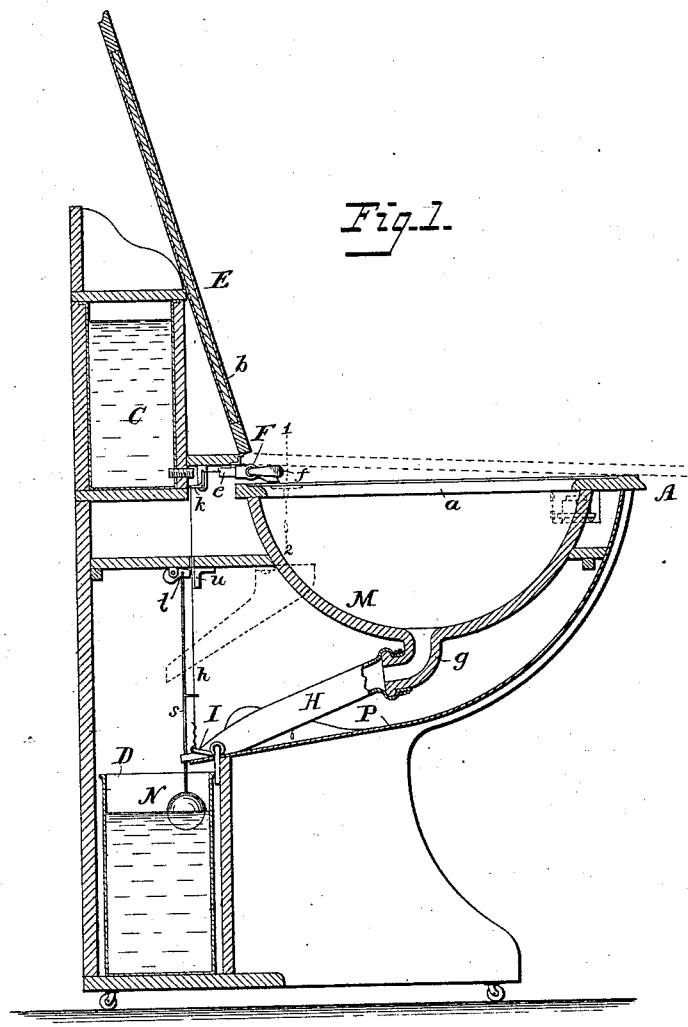
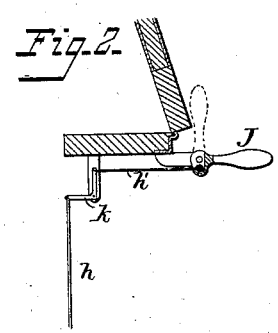
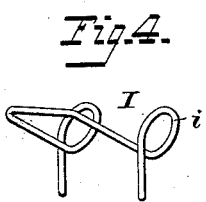
Attest:
Courtney A. Cooper
A. E. Hansmann
Inventor:
N. O. Bond
By Charles E. Foster
Atty

UNITED STATES PATENT OFFICE.

NATHAN O. BOND, OF FAIRFAX, VIRGINIA, ASSIGNOR TO JEROME F. JOHNSON AND FREDERICK W. PRATT, BOTH OF WASHINGTON, D. C.

WASH-STAND.

SPECIFICATION forming part of Letters Patent No. 285,001, dated September 18, 1883.

Application filed December 21, 1882. (No model.)

*To all whom it may concern:*

Be it known that I, NATHAN O. BOND, of Fairfax Court-House, Fairfax county, Virginia, have invented certain Improvements in Wash-Stands, of which the following is a specification.

My invention consists in certain improvements in wash-stands fully described hereinafter, intended to reduce the cost of the construction, to prevent injury from the overflow of the water, and otherwise increase the efficiency of the article.

In the drawings, Figure 1 is a sectional elevation of a wash-stand showing my improvement. Fig. 2 is a detached section. Fig. 3 is a section on the line 1 2, Fig. 1, and Fig. 4 is a detached view of the spring-clamp.

The frame of the stand is constructed in any suitable manner to support the slab A, which has the usual opening, *a*, the basin secured in a stationary position below said opening, a supply-tank, C, and the movable waste-water tank D. As shown in the drawings, the frame corresponds in shape to that of a writing-desk provided with a hinged lid, E, to the inner or lower face of which is secured a strip, *b*, of cloth coated with water-proof material, whereby water is prevented from coming in contact with the lid and warping or splitting the latter. The pipe *e*, leading from the tank C, extends below the hinged edge of the lid, and supports the cock F, having a handle, *f*, arranged as shown, so that when the lid is turned down the plug of the cock will be turned so as to cut off the flow of water, thereby preventing accidents that might result from the turning on of the cock and then closing the lid, so that the flow of water might not be discovered.

To avoid the expense and the danger of leakage resulting from securing in the outlet-opening of the basin the usual metallic nipple adapted to receive the plug, I dispense with said nipple and form a hollow neck, *g*, at the bottom of the basin, to which I secure a flexible tube, H, leading to the discharge-tank D, and with this tube I combine any suitable device for clamping it, so as to prevent the flow of water through the same.

I have shown in the drawings a hinged yoke, I, drawn down by springs *i*, formed by coiling the wire of which the spring is made so as to flatten and close the end of the tube H, and with this I combine a lever, J, bell-crank lever K, and cords *h h'*, arranged as shown, so that by turning the lever J the yoke may be raised to open the tube H or lowered to close it.

By the use of the tube H and its clamp I not only avoid the expense of sealing the nipple in the basin, but I further prevent the unpleasant odors apt to result from the adhesion of deposits to the inside of the discharge-pipe, for when the tube H becomes foul it can be untied from the neck *g*, detached and cleansed, and then replaced.

In place of using the ordinary drip-cup, I form a recess, *m*, in the slab A, with an opening, *n*, leading from said recess, at such a point that any drippings from the soap will fall upon the curved shield P and be conducted to the tank D; or a metal chute, which serves the purpose of a shield, may be arranged as shown in dotted lines, Fig. 1. As the neck *g* is bent at an angle to one side, the tube H is conducted to the tank D without being bent or curved, and its contraction at any point is thus prevented. To further prevent accidents liable to result from the overflow of the waste-tank, I combine with the latter and with the clamp-operating device a float-governor, whereby the clamp is held from opening in case the tank is full. Thus the float N is hung by a cord, *s*, to a weighted pawl, *t*, pivoted to bear upon a stop, *u*, between which and the pawl extends the cord *h*. The weight of the float keeps the pawl from contact with the cord until the float is near the top of the vessel, when the cord *s* will be slackened and the pawl will bear on the cord *h*, and any effort to draw the latter up and unlock the clamp will only serve to clamp the cord tightly and prevent it rising.

I claim—

1. A wash-basin provided with a discharge-orifice and neck, *g*, curved to one side, combined with a flexible tube, H, secured detachably to the neck and leading to a waste-water receptacle, substantially as set forth.

2. The combination, with the basin, waste-tank, flexible tube, and clamp I, of a float and stop device, whereby the raising of the clamp I is prevented when the tank is full, as set forth.

3. The combination of the basin, flexible discharge-tube, and clamping device I, stop $t\,u$, and float N, and cord $s$, substantially as specified.

In testimony whereof I have signed my name to this specification in the presence of two subscribing witnesses.

NATHAN O. BOND.

Witnesses:
WILLIAM PAXTON,
A. E. HANSMANN.